(12) United States Patent
Homer

(10) Patent No.: US 11,288,071 B2
(45) Date of Patent: Mar. 29, 2022

(54) SYSTEM AND METHOD FOR PREFETCHING INSTRUCTIONS AND DATA

(71) Applicant: Morgan Stanley Services Group Inc., New York, NY (US)

(72) Inventor: Jordan Homer, Belleville (CA)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 16/866,202

(22) Filed: May 4, 2020

(65) Prior Publication Data

US 2021/0342155 A1 Nov. 4, 2021

(51) Int. Cl.
G06F 9/38 (2018.01)
G06F 11/36 (2006.01)
G06F 9/30 (2018.01)
G06F 9/4401 (2018.01)

(52) U.S. Cl.
CPC ........ *G06F 9/3804* (2013.01); *G06F 9/30098* (2013.01); *G06F 9/3855* (2013.01); *G06F 9/4403* (2013.01); *G06F 11/3636* (2013.01); *G06F 11/3688* (2013.01)

(58) Field of Classification Search
CPC .................................................... G06F 9/3804
See application file for complete search history.

(56) References Cited

U.S. PATENT DOCUMENTS

| | | | |
|---|---|---|---|
| 6,167,536 A | 12/2000 | Mann | |
| 8,200,905 B2 | 6/2012 | Bell et al. | |
| 8,516,226 B1 * | 8/2013 | Collard | G06F 9/3808 |
| | | | 712/207 |
| 2007/0174555 A1 | 7/2007 | Burtscher et al. | |
| 2009/0210630 A1 | 8/2009 | Dimpsey et al. | |
| 2010/0146248 A1 | 6/2010 | Mayer et al. | |
| 2015/0378915 A1 | 12/2015 | Gschwind | |
| 2017/0132133 A1 | 5/2017 | Gschwind et al. | |
| 2018/0189067 A1 | 7/2018 | Busaba et al. | |
| 2018/0365156 A1 | 12/2018 | Gschwind et al. | |
| 2019/0073309 A1 | 3/2019 | Gschwind et al. | |
| 2019/0243768 A1 | 8/2019 | Doshi et al. | |

(Continued)

OTHER PUBLICATIONS

Lipp et al., Meltdown: Reading kernel memory from user space, 27th USENIX Security Symposium, Aug. 15-17, 2018, Baltimore, MD, USA, ISBN 978-1-939133-04-5, pp. 973-990.

(Continued)

*Primary Examiner* — Michael J Metzger
(74) *Attorney, Agent, or Firm* — Pearl Cohen Zedek Latzer Baratz LLP

(57) ABSTRACT

Systems and methods for prefetching instructions and data run a program in a test environment, execute a tracing application on the program to collect processor trace data, use the processor trace data to extract a plurality of instruction addresses and a single continuous stack range to be prefetched during a run-time of the program, at initialization of the program, load the extracted plurality of instruction addresses and the extracted stack range, relocate the plurality of extracted instruction addresses and the extracted stack range into the program, and at run-time, prefetch one or more of the plurality of extracted instruction addresses and the extracted stack range during idle time of the program.

20 Claims, 3 Drawing Sheets

(56) References Cited

U.S. PATENT DOCUMENTS

2019/0303157 A1    10/2019  Gschwind et al.
2019/0318080 A1*   10/2019  Sandoval ............ G06F 11/3688
2020/0409851 A1*   12/2020  Kalamatianos ..... G06F 16/2246

OTHER PUBLICATIONS

International Search Report for PCT Appl. No. PCT/US21/30574 dated Aug. 3, 2021.

* cited by examiner

SYSTEM AND METHOD FOR PREFETCHING INSTRUCTIONS AND DATA

FIELD OF THE INVENTION

The present invention is in the field of cache prefetching. In particular, the present invention is directed to providing systems and methods for prefetching instructions and data.

BACKGROUND OF THE INVENTION

Cache prefetching is a cache warming technique used by computer processors to boost execution performance by fetching instructions or data from their original storage in slower memory and moving the instructions or data to a faster local memory (e.g., cache) before the instructions or data are actually needed (hence the term 'prefetch'). Most modern computer processors have fast local cache memory in which prefetched instructions and data are held until required. The source for the prefetch operation is usually main memory. Because of their design, accessing cache memories is typically much faster than accessing main memory. Prefetching data or instructions and then accessing them from caches is therefore usually many orders of magnitude faster than accessing them directly from main memory.

Cache prefetching can either fetch data or instructions into cache. Data prefetching occurs when the processor calls data from memory into the cache before the processor needs it, thereby reducing memory-access latency and anticipating cache misses (e.g., times when the processor requests data that is not stored in the cache).

Instruction prefetch is a technique by which the processor speeds up the execution of a program by reducing wait states. Modern microprocessors are much faster than the memory where the program is kept, meaning that the program's instructions cannot be read fast enough to keep the microprocessor busy. Adding a cache provides faster access to needed instructions. Instruction prefetching occurs when a processor requests an instruction from main memory before it is needed. Once the instruction comes back from memory, it is placed in a cache. When an instruction is needed, the instruction can be accessed much more quickly from the cache than if it had to be requested from memory. Cache warming therefore can enable rarely executed but critical code to be accessed and executed faster.

However, unlike data prefetching, instruction cache prefetching is not supported by any common instruction set architecture (such as, e.g., ARM or x86). There are various reasons for this, including the cost-benefit of implementing currently available solutions. For example, in presently available systems and methods of instruction cache prefetching, the benefit of implementing such systems and methods is comparatively low:

(1) It is less common for applications to be bottlenecked by instruction cache misses in standard computing systems and is more common in low latency servers.

(2) Presently available methods of instruction prefetching typically suffer from poor performance, which limit their effectiveness, even in programs that are bottlenecked on instruction cache misses. The instruction pipeline is optimized for the throughput of a single stream of instructions. By contrast, the data pipeline is optimized for handling many concurrent memory accesses, meaning data prefetches can often be handled without slowing down the instruction stream.

(3) Software developers are typically ill-equipped to take advantage of the potential benefits of instruction cache fetching. The effectiveness of prefetching depends on the ability to select addresses. Programming languages readily expose the addresses of data, and the layout of data in memory is widely understood. By contrast, because of compiler optimizations, instruction layout is unpredictable and bears no resemblance to source code.

An instruction cache warming technique presently used throughout the industry is the so-called 'pre-execution' technique, which executes code with dummy data so that instructions are forced into the cache. Despite being common in the industry, this technique has a number of known deficiencies, including, for example: (1) The 'pre-execution' technique is time consuming to apply, and results in an optimization only for the application it was written for. (2) Some code in this scheme cannot be run because it has unavoidable side effects (i.e., there is less than 100% coverage). Because of this, the code is not cached, resulting in lost performance gains. (3) Cache warming code executed from the pre-execution technique can be incorrect, causing errors, crashes, or hangs in the program. (4) Cache warming code in presently available schemes like the pre-execution technique can occupy the processors for long periods of time (e.g., >10,000 ns), which can delay the processing of new input in low latency applications.

What is needed, therefore, is a universal Central Processing Unit (CPU or "processor") cache warmer for instruction prefetching that enables fast execution of critical code from cache without negatively affecting the low latency application.

SUMMARY OF EMBODIMENTS OF THE INVENTION

Embodiments of the invention include systems and methods for prefetching instructions and data. Embodiments may be performed on a server having a processor, memory, and one or more code sets stored in the memory and executing in the processor, which, when executed, configure the processor to: run a program in a test environment; execute a tracing application on the program to collect processor trace data; use the processor trace data to extract a plurality of instruction addresses and a single continuous stack range to be prefetched during a run-time of the program; at initialization of the program, load the extracted plurality of instruction addresses and the extracted stack range; relocate the plurality of extracted instruction addresses and the extracted stack range into the program; and at run-time, prefetch one or more of the plurality of extracted instruction addresses and the extracted stack range during idle time of the program.

In some embodiments, the stack range may be determined from a sequence of stack-operating instructions in the instruction trace. In some embodiments, when prefetching the one or more of the plurality of extracted instruction addresses and the extracted stack range, the processor may be further configured to: execute an instruction to begin transactional execution and specify a fallback address, in which the fallback address provides a safe exit from the transactional execution in the event of an aborted execution; issue an instruction with a fault which, upon retirement, causes transactional execution to abort; jump into an instruction address to be prefetched prior to the retirement of the exception-causing instruction; retire the exception-causing instruction; and re-steer execution to the fallback address.

In some embodiments, one or more architectural registers of the processor may be rendered unavailable while executing the faulting instruction at and beyond a prefetch address; and, each of the one or more architectural registers may be given a data dependency on the faulting instruction.

In some embodiments, the processor may be further configured to delay the execution of the fault by calculating a load address as a result of a data dependent chain of register-to-register instructions. In some embodiments, the length of the delay may be adjusted by controlling the number of instructions. In some embodiments, the processor may be further configured to prefetch two or more lines in reverse order.

In some embodiments, the processor may be further configured to prefetch all addresses at once, in which the prefetching is repeated only after a predefined duration. In some embodiments, the processor may be further configured to prefetch a beginning of every basic block that follows a branch. In some embodiments, the processor may be further configured to prefetch any time an interval between branches exceeds at least one of a predefined number of bytes and a predefined number of instructions.

These and other aspects, features, and advantages will be understood with reference to the following description of certain embodiments of the invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
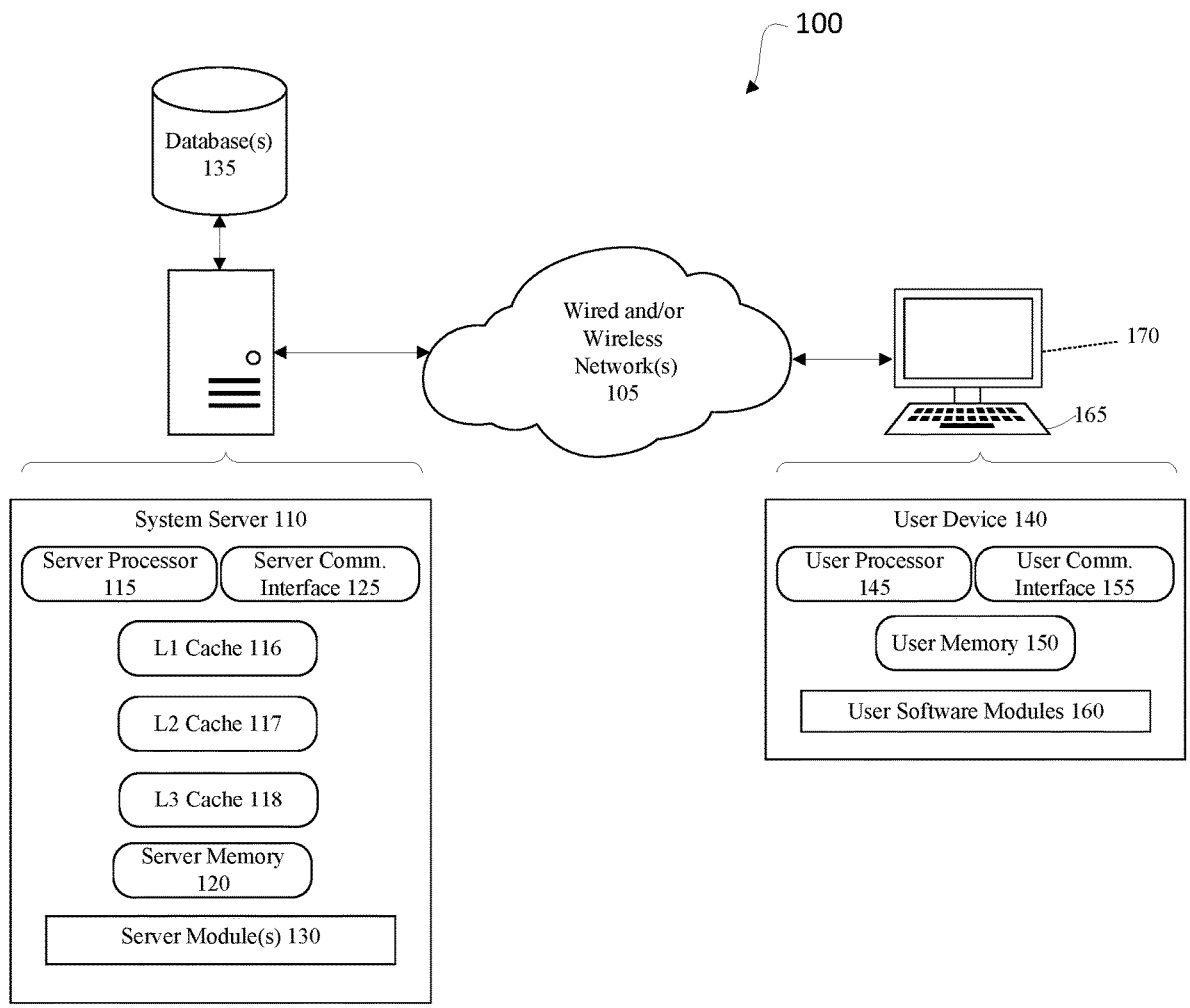
FIG. 1 is a high-level diagram illustrating an example configuration of a system for prefetching, according to at least one embodiment of the invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory processor-readable storage medium that may store instructions, which when executed by the processor, cause the processor to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof may occur or be performed simultaneously, at the same point in time, or concurrently.

Embodiments of the invention enable instruction addresses (e.g., the execution path between two source code locations) to be determined completely and empirically using an execution path tracing technology, such as, for example, Intel Processor Trace. In some embodiments, the instruction trace may be processed into a set of fetch addresses for prefetching. The instruction trace may further be analyzed to determine its stack usage. In some embodiments, the application may load the addresses and stack range from a file and relocate them to its own address spaces upon startup. During the idle time of the application, instruction and stack addresses may be prefetched, e.g., repeatedly, periodically, etc. This ensures that the critical execution path is cached by the CPU when execution takes place, thereby improving performance.

In some embodiments, random access instruction cache prefetching is made possible by a sequence of instructions that cause the CPU to execute the code non-architecturally. The prefetching technique is enhanced to prevent incorrect and unintended data cache entries or branch prediction information from being stored. In some embodiments, the set of addresses may be prefetched in a special order so as to fill lower level caches with the beginning of the critical execution path, further improving performance over a naive prefetch order.

Embodiments of the invention provide various benefits over prior art systems and methods, including, for example: (1) embodiments of the invention enable empirical determination of critical execution path code addresses and stack addresses for the purpose of prefetching, which allows the technique to easily generalize to any compiled application, and any interval of code that can be delimited in source. (2) Embodiments of the invention provide systems and methods of effecting an instruction cache prefetch of an arbitrary address without program side-effects. The technique may be based on transactional execution (e.g., using Intel TSX) and out of order execution, as described herein. (3) Embodiments of the invention further provide a technique to constrain transient execution so as to prevent incorrect data cache entries from being loaded and incorrect branch prediction information from being learned. (4) Embodiments of the invention provide an algorithm for determining prefetch order such that the beginning of the execution path is placed in lower level caches.

FIG. 1 shows a high-level diagram illustrating an example configuration of a system 100 for providing instruction cache prefetching, according to at least one embodiment of the invention. System 100 includes network 105, which may include the Internet, one or more telephony networks, one or more network segments including local area networks (LAN) and wide area networks (WAN), one or more wireless networks, or a combination thereof. System 100 also includes a system server 110 constructed in accordance with one or more embodiments of the invention. In some embodiments, system server 110 may be a stand-alone computer system. In other embodiments, system server 110 may include a network of operatively connected computing devices, which communicate over network 105. Therefore, system server 110 may include multiple other processing machines such as computers, and more specifically, stationary devices, mobile devices, terminals, and/or computer servers (collectively, "computing devices"). Communication with these computing devices may be, for example, direct or indirect through further machines that are accessible to the network 105.

System server 110 may be any suitable computing device and/or data processing apparatus capable of communicating with computing devices, other remote devices or computing networks, receiving, transmitting and storing electronic information and processing requests as further described herein. System server 110 is therefore intended to represent various forms of digital computers, such as laptops, desktops, workstations, personal digital assistants, servers, blade servers, mainframes, and other appropriate computers and/or networked or cloud based computing systems capable of employing the systems and methods described herein.

System server 110 may include a server processor 115 which is operatively connected to various hardware and software components that serve to enable operation of the system 100. Server processor 115 serves to execute instructions to perform various operations and other functions of embodiments of the invention as will be described in greater detail below. Server processor 115 may be one or a number of processors, central processing units (CPUs), graphics processing units (GPUs), a multi-processor core, or any other type of processor, depending on the particular implementation. Server processor 115 may have one or more of instruction cache and data cache, as described herein. The instruction cache is used to read instructions of a program, module or application run on system server 110. When the processor executes tight loops, for example, it is faster to read the instructions inside the loop from the instruction cache, than read the instructions from a main memory. Thus, small, tight loops are faster than larger loops that do not fit in the instruction cache.

Server processor 115 may include various levels of memory cache (notated L1, L2, L3, etc.). For example, each CPU may include a Level 1 (L1) cache 116 and a Level 2 (L2) cache 117. L1 cache 116 may be a small but very fast memory for the server processor 115 to read from. L2 cache 117 may be a larger but slower to read from cache than L1 cache 116. Typically, when a processor reads data from a main memory it reads a block of data into its L2 and L1 caches. It is faster to read bigger blocks of memory at a time from a main memory than one byte (or 64 bit) at a time. Once the data is inside the L1 cache 116 and L2 cache 117 the processor can access them much faster. If the processor changes any of the data in the caches, that data needs to be written back to the main memory at some point.

Server processor 115 may further include a Level 3 (L3) cache 118. L3 cache is typically a cache layer that sits on top of the main memory. The L3 cache 118 is thus shared by all processors (e.g., all CPUs) on the motherboard of system server 110. Whenever data is needed by a processor (e.g., server processor 115) from a main memory, a bigger block of data is read into L3 cache 118. In case a processor needs more data stored consecutively after the memory it requested previously, that memory is typically found in L3 cache 118.

In some embodiments, a server memory 120 is accessible by server processor 115, thereby enabling server processor 115 to receive and execute instructions such a code, stored in the memory and/or storage in the form of one or more server modules 130, each module representing one or more code sets. The server modules 130 may include one or more software programs or applications (collectively referred to as "program(s) or "application(s)") having computer program code or a set of instructions executed partially or entirely in server processor 115 for carrying out operations for aspects of the systems and methods disclosed herein, and may be written in any combination of one or more programming languages. Server processor 115 may be configured to carry out embodiments of the present invention by for example executing code or software, and may be or may execute the functionality of the modules as described herein.

System server 110 may be configured to communicate via communication interface 125 with various other devices connected to network 105. For example, communication interface 125 may include but is not limited to, a modem, a Network Interface Card (NIC), an integrated network interface, a radio frequency transmitter/receiver (e.g., Bluetooth wireless connection, cellular, Near-Field Communication (NFC) protocol, a satellite communication transmitter/receiver, an infrared port, a USB connection, and/or any other such interfaces for connecting the system server 110 to other computing devices and/or communication networks such as private networks and the Internet.

As shown in FIG. 1, various software modules may be executed by server processor 115 to facilitate communication between system server 110 and the various software and hardware components of system 100, such as, for example, server database 135 and/or user device(s) 140 as described herein. It should be noted that in accordance with various embodiments of the invention, server modules 130 may be executed entirely on system server 110 as a stand-alone software package, partly on system server 110 and partly on user device 140, or entirely on user device 140.

Server memory 120 may be, for example, a random access memory (RAM) or any other suitable volatile or non-volatile computer readable storage medium. Server memory 120 may also include storage which may take various forms, depending on the particular implementation. For example, the storage may contain one or more components or devices such as a hard drive, a flash memory, a rewritable optical disk, a rewritable magnetic tape, or some combination of the above. In addition, the memory and/or storage may be fixed or removable. In addition, memory and/or storage may be local to the system server 110 or located remotely.

Because of all the caching layers, and how ordinary hard disks function, sequential data access is faster than arbitrary data access. The reason for this is that all caching strategies are based on the assumption that a program will access data sequentially. When a processor requests a piece of data from main memory (e.g., server memory 120), the hardware assumes that the processor will likely soon request the next byte (or 64 bit block) after that, etc. Since many memory and disk technologies are fast at reading larger blocks of memory at a time, the hardware is configured to copy such bigger blocks of memory at a time. If the processor actually processes the memory sequentially, accessing the next address in the data block is faster because it is already present in the cache.

This kind of big-block-loading behavior is true for all cache layers, all the way down to the hard disk. Even the hard disk can read bigger blocks of data from the disk faster than reading the data one byte at a time. This caching behavior means that accessing data sequentially is much faster than accessing data at arbitrary addresses. When data is accessed at arbitrary addresses in memory (or on disk) it is much slower because the data requested is seldomly located in a cache. That means that the data must be loaded in from disk, main memory, another cache layer etc., which is slower than accessing directly in the closest cache (preferably L1).

In accordance with further embodiments of the invention, system server 110 may be connected to one or more database(s) 135, for example, directly or remotely via network 105. Database 135 may include any of the memory configurations as described above, and may be in direct or indirect communication with system server 110. System server 110 may include one or more input devices and/or one or more output devices (not shown), e.g., as described herein.

As described herein, among the computing devices on or connected to the network 105 may be one or more user devices 140. User device 140 may be any standard computing device. As understood herein, in accordance with one or more embodiments, a computing device may be a stationary computing device, such as a desktop computer, kiosk and/or other machine, each of which generally has one or more processors, such as user processor 145, configured to execute code to implement a variety of functions, a computer-readable memory, such as user memory 150, various levels of cache (not shown), a user communication interface 155 for connecting to the network 105, one or more client modules, such as user module(s) 160, one or more input devices, such as input devices 165, and one or more output devices, such as output devices 170. Typical input devices, such as, for example, input device(s) 165, may include a keyboard, pointing device (e.g., mouse or digitized stylus), a web-camera, and/or a touch-sensitive display, etc. Typical output devices, such as, for example output device 170 may include one or more of a monitor, display, speaker, printer, etc.

Additionally or alternatively, a computing device may be a mobile electronic device ("MED"), which is generally understood in the art as having hardware components as in the stationary device described above, and being capable of embodying the systems and/or methods described herein, but which may further include componentry such as wireless communications circuitry, gyroscopes, inertia detection circuits, geolocation circuitry, touch sensitivity, among other sensors. Non-limiting examples of typical MEDs are smartphones, personal digital assistants, tablet computers, and the like, which may communicate over cellular and/or Wi-Fi networks or using a Bluetooth or other communication protocol. Typical input devices associated with conventional MEDs include, keyboards, microphones, accelerometers, touch screens, light meters, digital cameras, and the input jacks that enable attachment of further devices, etc.

In some embodiments, user device 140 may be a "dummy" terminal, by which processing and computing may be performed on system server 110, and information may then be provided to user device 140 via server communication interface 125 for display and/or basic data manipulation. In some embodiments, modules depicted as existing on and/or executing on one device may additionally or alternatively exist on and/or execute on another device.

Figure 2:
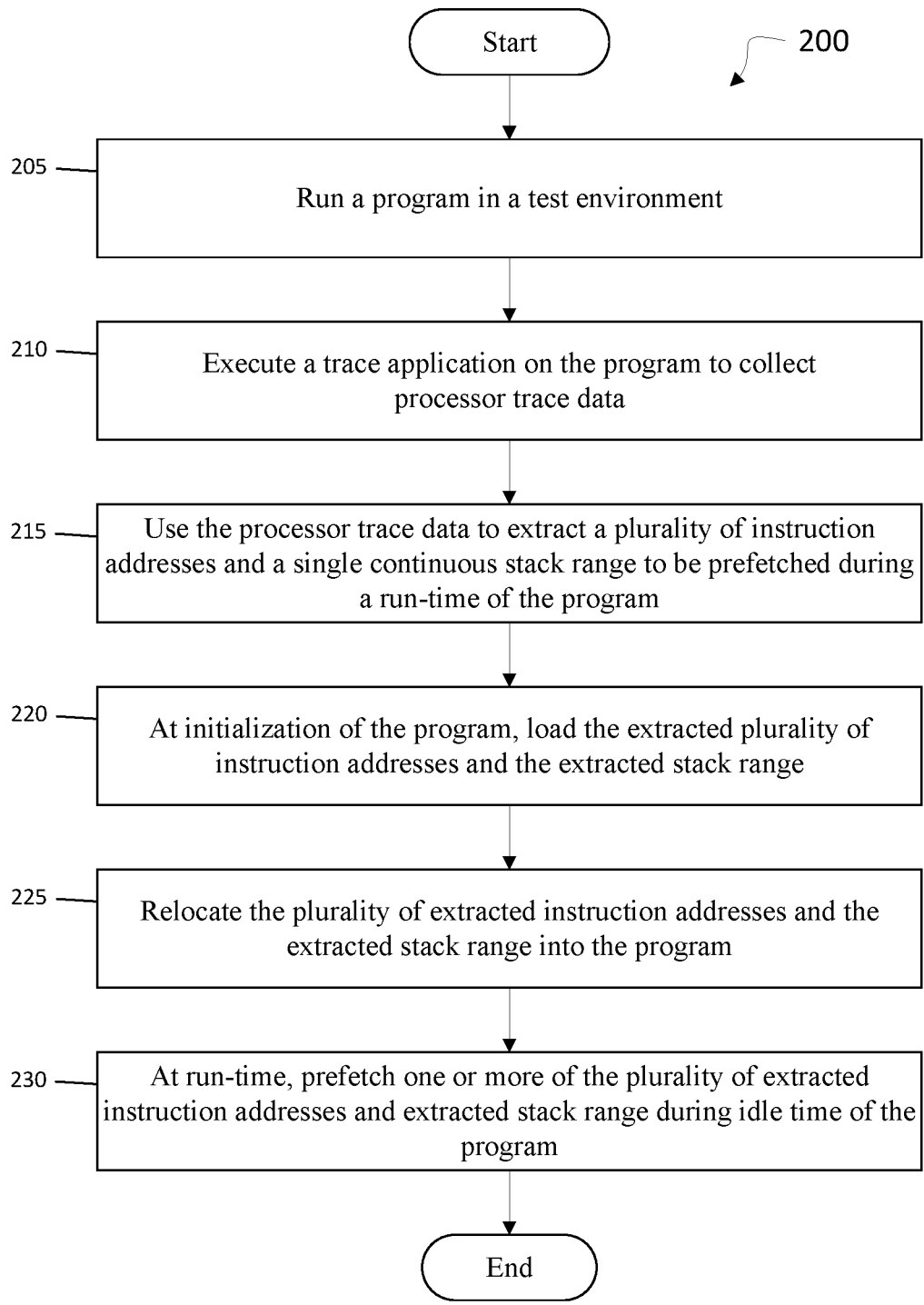
FIG. 2 is a flow diagram of a method for prefetching according to at least one embodiment of the invention.

FIG. 2 shows a flow diagram of a method 200 for prefetching instructions and data according to at least one embodiment of the invention. Method 200 starts at step 205 when system server 110, using a processor, e.g., server processor 115, configured to execute one or more server modules 130, runs a program in a test environment. In some embodiments, a test environment may be a virtual and/or physical server or other platform, or setup of software and hardware, that allows a user to run defined test cases or code. A test environment supports test execution with hardware, software and network configured. A test environment enables a user to create identical or similar environments to a run-time environment, such that a program can be executed in a controlled environment.

At step 210, the system server 110 may be configured by code executing in the processor, e.g., server processor 115, to execute a trace application on the program to collect processor trace data. Unlike data prefetching, instruction is not natively supported by any modern CPU. Instead, in some embodiments, prefetching is made to occur using one or more techniques, for example, based on a computer malware called "Meltdown."

Typically, a modest amount of memory within the processor is used to ensure it can work at high speed, to speed up memory access, and to facilitate "intelligent" execution of instructions in an efficient manner. From the perspective of a processor, the computer's physical memory is slow to access. Furthermore, the instructions a processor runs are very often repetitive, or access the same or similar memory numerous times. To maximize efficient use of the processor's resources, modern processors often have a modest amount of very fast cache. When data is accessed or an instruction is read from physical memory, a copy of that information is routinely saved in the processor cache at the same time. If the processor later needs the same instruction or memory contents again, it can obtain it with minimal delay from its own cache rather than waiting for a request related to physical memory to take place.

Embodiments of the invention, broadly, implement a similar approach to a Meltdown attack by executing the target instructions following an exception inside a transactional execution region and capturing those instructions. In some embodiments, the instruction addresses comprising the execution path between two source code locations are determined completely and empirically using an execution path tracing technology, such as, for example, Intel Processor Trace. A simplified implementation is presented below in Example 1 for explanatory purposes.

Example 1

| void codePrefetch(void * in) | | | |
|---|---|---|---|
| 405040: | c7 f8 0c 00 00 00 | xbegin | 405052 |
| 405046: | 48 c7 c2 00 00 00 00 | mov | rdx, 0x0 |

-continued

| | | void codePrefetch(void * in) | | |
|---|---|---|---|---|
| 40504d: | 48 8b 12 | | mov | rdx, QWORD PTR [rdx] |
| 405050: | ff e7 | | jmp | rdi |
| 405052: | c3 | | ret | |

In Example 1 above, at function entry, the address of the instructions to be prefetched is in the register rdi. The initial xbegin instruction at 0x405040 creates a fallback address leading to the safe exit of the function in the event of an RTM abort, as explained herein. Subsequently, an exception can be caused, e.g., by dereferencing a null pointer at 0x40504d. When this instruction retires, the fault causes transactional execution to abort, reverting all architectural side-effects to the state they were in before the xbegin, jumping to the fallback address that returns from the function, and suppressing the exception. However, because of the pipelining inherent in modern processors, there is a window of time before the fault retires in which subsequent instructions may be executed. It is in this window that the jmp instruction at 0x405050 is executed and re-steers instruction fetches to the target instructions. Note that since the jump is an indirect branch, in some embodiments it may not be predicted correctly. The correct instructions are only fetched once the branch executes, causing a misprediction. Crucially, in some embodiments, even though execution was aborted, instruction cache side effects are retained.

In some embodiments, trace collection attempts to capture the instructions executed between two probes inserted into the source code of the application. A tracing program such as, for example, Processor Trace, may be activated in the application by attaching an external profiling application, e.g., linux Perf. In some embodiments, the profiling application (e.g., Perf) is configured in 'snapshot mode', so that a trace may be continuously collected in a ring buffer until a signal is received (SIGUSR2), and the ring buffer may be written to disk or otherwise saved. This allows the collection of small traces in response to events. In some embodiments, the application being profiled may send SIGUSR2 to perf when it enters its end probe.

In some embodiments, the resulting trace may contain, e.g., thousands of instructions following the application's end probe and invocation of a 'kill' system call. In some embodiments, the trace may contain the begin probe and intermediate instructions if the ring buffer was configured large enough. To facilitate post-processing, in some embodiments, the beginning and end probes call marker functions whose purpose is to be searchable in the symbol names of the trace. Since relocation will be required, in some embodiments, the application also stores a snapshot of its own/proc/pid/maps files inside its end probe.

To facilitate stack use analysis, in some embodiments, the stack offset inside the begin probe may be recorded. The stack offset is the byte position of the stack pointer relative to the base of the stack, which is invariant with respect to address space relocation. This is only done the first time the begin probe is encountered.

At step 215, the system server 110 may be configured by code executing in the processor, e.g., server processor 115, to use the processor trace data to extract a plurality of instruction addresses and a single continuous stack range to be prefetched during a run-time of the program. In some embodiments, the trace is used to generate instruction addresses and a stack range to be prefetched by the application. Trace decoding may be provided by an external profiling application, e.g., Linux perf in conjunction with Intel X86 Encoder Decoder (XED—a software library for encoding and decoding instructions), to decode instruction operation codes into a human-readable forms. The decoded trace contains the symbol names for each instruction address. This is used to clamp the trace to the section between the begin and end probes.

In some embodiments, instruction addresses may be readily available from the trace, but may need to be filtered to reduce the number of addresses. Accordingly, in some embodiments, the processor may use the fact that the transient execution-based instruction prefetch is able to fetch and decode many dozens of instructions starting at the prefetch address. All that needs to be accounted for is the limited range and possibility that branches would be predicted incorrectly. Therefore, in some embodiments, the processor may prefetch the beginning of every basic block that follows a conditional or indirect branch. In addition, in some embodiments a prefetch address may be saved any time an interval between branches exceeds a fixed number of bytes (e.g., 64) and/or a predefined number of instructions (e.g., 16). Duplicate addresses may then be removed from the trace while preserving the order in which the address was first encountered.

In some embodiments, multiple traces that may have been collected may be then combined into a single trace. The purpose of this is to gather addresses that may not occur in every trace. Embodiments of the invention therefore employ an algorithm to aggregate the reduced instruction addresses. In some embodiments, traces may then be interlaced and/or duplicate addresses may be removed. In some embodiments, the addresses may then be normalized into a form that facilitates relocation by the application. Using the original applications/proc/pid/maps file, the processor may convert the virtual addresses collected into binary name and offset, and these addresses may be written to a file, e.g., for later use.

In some embodiments, the stack range may be determined from a sequence of stack-operating instructions in the instruction trace. In some embodiments, the processor may be configured to determine the range of values of the stack pointer from the trace. For example, on a 64-bit machine, the stack pointer is decreased by 8 each time the trace encounters a 'call', 'enter', or 'push'. Likewise, the stack pointer is increased by 8 when 'ret', 'leave', or 'pop' is encountered. In addition, the stack pointer is operated on using register-immediate instructions such as 'add rsp, imm' and 'sub rsp, imm'. By walking the trace in order, the processor may accumulate the result of these stack pointer modifying instructions.

In some embodiments, for each trace, the maximum and minimum stack offset encountered may be computed. To aggregate for multiple traces, in some embodiments the processor may compute, e.g., the smallest minimum and largest maximum. Because the application stores the stack offset relative to the stack base address, in some embodiments, the processor may be configured to add this value to the range to render it relative to the base address. In some embodiments, this range of stack offsets is written to a file, e.g., for later use.

At step 220, the system server 110 may be configured by code executing in the processor, e.g., server processor 115, to load, at initialization of the program, the extracted plurality of instruction addresses and the extracted stack range. Specifically, in some embodiments, the address and stack information written to file(s) in step 215 may be loaded at initialization of the program, for prefetching purposes.

At step 225, the system server 110 may be configured by code executing in the processor, e.g., server processor 115, to relocate the plurality of extracted instruction addresses and the extracted stack range into the program. In some embodiments, on startup, the application may be configured to read the loaded instruction information and relocate it into its own address space. Likewise, in some embodiments, on application startup, the stack offsets that were loaded may be read and the ranges may be converted to a pointer in the address space of the application, e.g., by adding the stack base address.

At step 230, the system server 110 may be configured by code executing in the processor, e.g., server processor 115, to, at run-time, prefetch one or more of the plurality of extracted instruction addresses and the extracted stack range during idle time of the program. In some embodiments, prefetching may run continuously during the application's idle time (or on another predefined schedule as desired). In some embodiments, a single address may be selected for prefetching, e.g., following a reverse round-robin and/or optimized pattern (as explained herein). Each time a prefetch occurs, in some embodiments the processor may be configured to yield to check for an incoming workload, so as not to add latency by blocking. In some embodiments, each cache line in the stack range may be prefetched in a reverse round-robin pattern. Since modern processors have significant parallelism in their load units and cache hierarchy, many addresses (e.g., 8) may be prefetched before yielding. Step 230 is explained in more detail with reference to FIG. 3 below.

Figure 3:
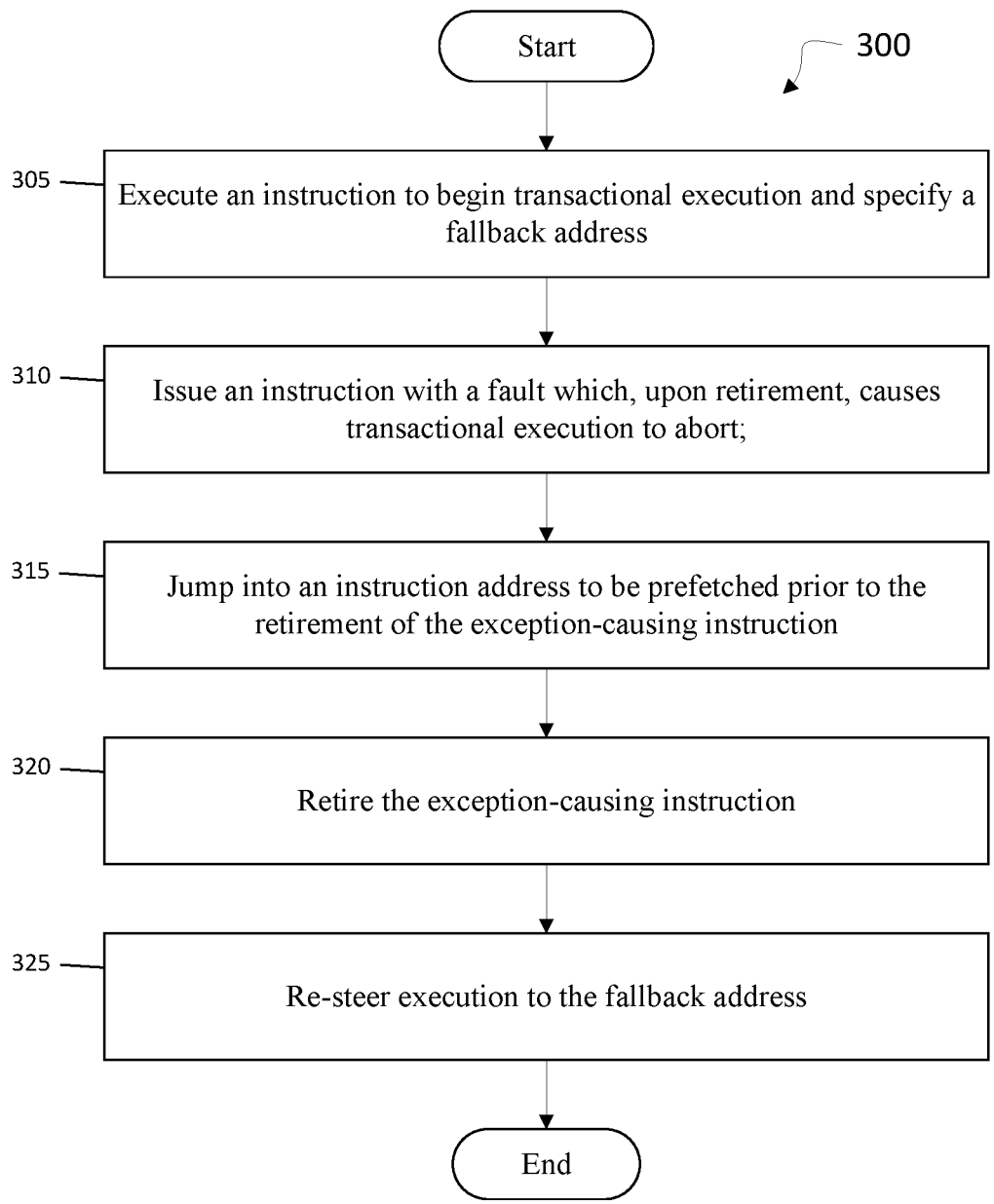
FIG. 3 is a flow diagram of a method for prefetching during run-time according to at least one embodiment of the invention.

FIG. 3 shows a flow diagram of a method 300 for prefetching during run-time according to at least one embodiment of the invention. Specifically, prefetching the one or more of the plurality of extracted instruction addresses and the extracted stack range starts at step 305 when system server 110, using a processor, e.g., server processor 115, configured to execute one or more server modules 130, executes an instruction to begin transactional execution and specify a fallback address. In some embodiments, the initial XBEGIN instruction creates a fallback address leading to the safe exit of the function in the event of an RTM abort. Typically, following an RTM abort, a logical processor resumes execution at the fallback address computed through the outermost XBEGIN instruction. Accordingly, in some embodiments, the fallback address may provide a safe exit from the transactional execution in the event of an aborted execution.

At step 310, the system server 110 may be configured by code executing in the processor, e.g., server processor 115, to issue an instruction with a fault which, upon retirement, causes transactional execution to abort. In some embodiments, an exception may be created, e.g., by dereferencing a null pointer (as shown in the Example 1, above, at 0x40504d). In some embodiments, one or more architectural registers of the processor are rendered unavailable while executing the faulting instructions at (and beyond) the prefetch address; each register may be given a data dependency on the faulting instruction (e.g., by assigning the register to the value loaded from the null pointer, which can never be loaded successfully). When this instruction retires, the fault causes transactional execution to abort, reverting all architectural side-effects to the state they were in before the XBEGIN, jumping to the fallback address that returns from the function, and suppressing the exception. However, because of the pipelining inherent in modern processors, there is a window of time before the fault retires in which subsequent instructions may be executed.

In some embodiments, if the faulting instruction retires too early, there may not be enough time for instructions to be fetched and decoded. Therefore, embodiments of the invention delay the execution of the faulting load, for example, by calculating the load address as the result of a data-dependent chain of register-to-register instructions. The length of the delay may be adjusted by controlling the number of such instructions. In some embodiment, for example, a sequence of multiplications may be used, followed by a subtraction of the expected result, to zero the register that will be dereferenced.

At step 315, the system server 110 may be configured by code executing in the processor, e.g., server processor 115, to jump into an instruction address to be prefetched prior to the retirement of the exception-causing instruction. During the window created by the exception in step 310, the "jmp" (jump) instruction may be executed (see at 0x405050 of Example 1 above) enabling re-steering of instruction fetches to the target instructions. Since the jump is an indirect branch, it may not be predicted correctly. The correct instructions are only fetched once the branch executes, causing a misprediction. Crucially, even though execution was aborted, instruction cache side effects are retained, as discussed herein.

In some embodiments, execution at the target instructions may be exposed to an incorrect program state consisting of the register values before entry. Data cache pollution results when these register values are used to determine the address of loads and stores. Likewise, they may be instruction cache pollution if the registers are used to execute branches. To prevent incorrect registers from being executed on, in some embodiments, the processor may be configured to assign each named register to the value of the faulting load. In such embodiments, the processor must wait for the dependency chain to be resolved before using the value; however, the value can never be delivered since it results in an exception. In some embodiments, the target instruction address may be stored in a static variable, and the indirect branch points to this value, e.g., using RIP-relative addressing (RIP, the instruction pointer, is the register that points to the next instruction to be executed) so as not to require a register.

Some processors (e.g., Intel CPUs) maintain a stack of call addresses that are used to predict the address of return instructions. However, these values can be polluted during transient execution, and fetching their address may result in undesired instructions being cached. To combat this, in some embodiments, the processor may be configured to the target instructions rather than a jump. If transient execution encounters an imbalance of return instructions, execution is directed to an XABORT instruction.

At step 320, the system server 110 may be configured by code executing in the processor, e.g., server processor 115, to retire the exception-causing instruction.

At step 325, the system server 110 may be configured by code executing in the processor, e.g., server processor 115, to re-steer execution to the fallback address. In some embodiments, an optimization for prefetching large working sets is provided. When prefetching a function consisting of a contiguous set of instructions, in linear order from start to finish, that function may exceed the size of the L1 cache (e.g., L1 cache 116 of FIG. 1). Since the end of the function was most recently executed, it resides in the L1 cache, and the beginning resides in the L2 cache (e.g., L2 cache 117 of FIG. 1). When the function is executed, a line is loaded from the L2 cache into the L1 cache, evicting a later line into the L2 cache. On most processors (e.g., CPUs), the least recently used line will be evicted, which in this case is also the line to be executed next. For this reason, every cache line of the function is drawn from the L2 cache even though the size may only narrowly exceed the capacity of the L1 cache.

In the above example, embodiments of the invention may ensure that the beginning of the function is loaded from the L1 cache by changing the order in which lines are prefetched. Specifically, in some embodiments, the processor may be configured to prefetch two or more lines in reverse order, which achieves the desired effect. In general, instruction working sets are not laid contiguously and may be of any size. Further, the placement of a working set in the cache hierarchy typically depends on cache level capacities, line size, and associativity. This prefetching order (i.e., reverse order) may still be optimal given those complexities, as long as the replacement policy is least recently used.

Furthermore, it is undesirable to block prefetch hundreds of lines, since doing so would delay processing a critical workload were one to arrive during that time. Instead, embodiments of the invention allow prefetching to yield at an arbitrary stopping point, while still maintaining the improved cache placement from the reverse-order technique. For example, in some embodiments, the processor may be configured to prefetch all addresses at once, but to repeat this only after a long duration (e.g., 10 ms) or other predefined duration. A random interruption would then be likely to land during idle time. In some embodiments, the arrival of a workload may be allowed to interrupt prefetching, but may lead to reduced performance.

Various embodiments of the invention described herein improve the performance of low-latency applications using the well-known strategy of cache-warming, but with improved effectiveness and reduced implementation effort. For example:

Embodiments of the invention provide a solution that is universal rather than bespoke, which reduces the upfront installment and ongoing maintenance cost of associated with its use relative to existing approaches.

Embodiments of the invention provide improved stability over existing approaches since they do not depend on the correctness of a human-written cache warming code.

Embodiments of the invention ensure the complete set of executed instructions is prefetched by coupling comprehensive execution path tracing with an arbitrary address instruction prefetch function. Improved coverage improves performance. Prior art approaches for cache warming left gaps in coverage where code addresses could not be identified, or the existence of undesirable side effects prevented the code from being executed in a dry run.

Embodiments of the invention provide enhancements to prefetch order, which improve performance, are uniquely available to a random access prefetching approach, and are not possible with ordinary linear pre-execution.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

What is claimed is:

1. A method for prefetching instructions and data, comprising:
   running, by the processor, a program in a test environment;
   executing, by the processor, a tracing application on the program to collect processor trace data;
   using, by the processor, the processor trace data to extract a plurality of instruction addresses and a single continuous stack range to be prefetched during a run-time of the program;
   at initialization of the program, loading by the processor the extracted plurality of instruction addresses and the extracted stack range;
   relocating, by the processor, the plurality of extracted instruction addresses and the extracted stack range into the program; and
   at run-time, prefetching by the processor one or more of the plurality of extracted instruction addresses and the extracted stack range during idle time of the program.

2. The method as in claim 1, wherein the stack range is determined from a sequence of stack-operating instructions in the instruction trace.

3. The method as in claim 1, wherein prefetching the one or more of the plurality of extracted instruction addresses and the extracted stack range further comprises:
   executing, by the processor, an instruction to begin transactional execution and specify a fallback address;
      wherein the fallback address provides a safe exit from the transactional execution in the event of an aborted execution;
   issuing, by the processor, an instruction with a fault which, upon retirement, causes transactional execution to abort;
   jumping, by the processor, into an instruction address to be prefetched prior to the retirement of the exception-causing instruction;
   retiring the exception-causing instruction; and
   re-steering, by the processor, execution to the fallback address.

4. The method as in claim 3, wherein one or more architectural registers of the processor are rendered unavailable while executing the faulting instruction at and beyond a prefetch address; and
   wherein, each of the one or more architectural registers is given a data dependency on the faulting instruction.

5. The method as in claim 3, further comprising delaying the execution of the fault by calculating a load address as a result of a data dependent chain of register-to-register instructions.

6. The method as in claim 5, wherein the length of the delay is adjusted by controlling the number of instructions.

7. The method as in claim 1, further comprising, prefetching two or more lines in reverse order.

8. The method as in claim 1, further comprising, prefetching all addresses at once, wherein the prefetching is repeated only after a predefined duration.

9. The method as in claim 1, further comprising prefetching a beginning of every basic block that follows a branch.

10. The method as in claim 1, further comprising prefetching any time an interval between branches exceeds at least one of a predefined number of bytes and a predefined number of instructions.

11. A system for prefetching instructions and data, comprising:
a server having a processor and memory; and
the memory having one or more code sets stored within the memory and executing in the processor;
wherein the processor is configured to:
run a program in a test environment;
execute a tracing application on the program to collect processor trace data;
use the processor trace data to extract a plurality of instruction addresses and a single continuous stack range to be prefetched during a run-time of the program;
at initialization of the program, load the extracted plurality of instruction addresses and the extracted stack range;
relocate the plurality of extracted instruction addresses and the extracted stack range into the program; and
at run-time, prefetch one or more of the plurality of extracted instruction addresses and the extracted stack range during idle time of the program.

12. The system as in claim 11, wherein the stack range is determined from a sequence of stack-operating instructions in the instruction trace.

13. The system as in claim 11, wherein, when prefetching the one or more of the plurality of extracted instruction addresses and the extracted stack range, the processor is further configured to:
execute an instruction to begin transactional execution and specify a fallback address;
wherein the fallback address provides a safe exit from the transactional execution in the event of an aborted execution;
issue an instruction with a fault which, upon retirement, causes transactional execution to abort;
jump into an instruction address to be prefetched prior to the retirement of the exception-causing instruction;
retire the exception-causing instruction; and
re-steer execution to the fallback address.

14. The system as in claim 13, wherein one or more architectural registers of the processor are rendered unavailable while executing the faulting instruction at and beyond a prefetch address; and
wherein, each of the one or more architectural registers is given a data dependency on the faulting instruction.

15. The system as in claim 13, wherein the processor is further configured to delay the execution of the fault by calculating a load address as a result of a data dependent chain of register-to-register instructions.

16. The system as in claim 15, wherein the length of the delay is adjusted by controlling the number of instructions.

17. The system as in claim 11, wherein the processor is further configured to prefetch two or more lines in reverse order.

18. The system as in claim 11, wherein the processor is further configured to prefetch all addresses at once, wherein the prefetching is repeated only after a predefined duration.

19. The system as in claim 11, wherein the processor is further configured to prefetch a beginning of every basic block that follows a branch.

20. The system as in claim 11, wherein the processor is further configured to prefetch any time an interval between branches exceeds at least one of a predefined number of bytes and a predefined number of instructions.

* * * * *